United States Patent [19]

Sommer et al.

[11] 4,008,216
[45] Feb. 15, 1977

[54] BENZENESULPHONYLBENZENESUL-PHONAMIDEAZOPHENYL-OR-NAPHTHYL-AZOLHYDROXYLOWERALKOXYPHENYL DYESTUFFS

[75] Inventors: Richard Sommer, Leverkusen; Gerhard Wolfrum, Bergisch-Neukirchen, both of Germany

[73] Assignee: Bayer Aktiengesellschaft, Leverkusen, Germany

[22] Filed: Mar. 3, 1975

[21] Appl. No.: 554,616

[30] Foreign Application Priority Data

Mar. 9, 1974 Germany ......................... 2411291

[52] U.S. Cl. .............................. 260/186; 260/174; 260/177; 260/178; 260/184; 260/187; 260/191

[51] Int. Cl.² ................. C09B 31/06; C09B 43/00; D06P 1/06; D06P 3/24

[58] Field of Search .......... 260/187, 174, 177, 178, 260/184, 191, 186

[56] References Cited
UNITED STATES PATENTS

| | | | |
|---|---|---|---|
| 2,317,387 | 4/1943 | Kvalnes et al. | 260/186 X |
| 2,891,049 | 6/1959 | Exner et al. | 260/199 |
| 3,310,550 | 3/1967 | Liechti | 260/152 |
| 3,725,384 | 4/1973 | Zickendraht et al. | 260/186 |

Primary Examiner—Floyd D. Higel
Attorney, Agent, or Firm—Plumley and Tyner

[57] ABSTRACT

Dyestuffs of the formula

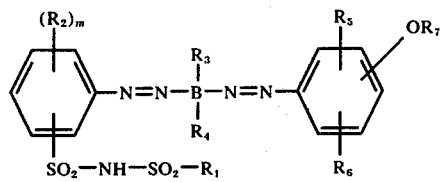

wherein
B represents a 1,4-phenylene, 5,6,7,8-tetrahydro-1,4-naphthylene or 1,4-naphthylene radical,
$R_1$ represents an aromatic, aliphatic or dialkylamino radical,
$R_2$ represents chlorine, bromine, an alkyl group or an alkoxy group,
$R_3$ and $R_4$ represent hydrogen, chlorine, bromine, an alkoxy group or an alkyl group,
$R_5$ and $R_6$ represent hydrogen, an alkyl group with 1–4 C atoms or an alkoxy group with 1–4 C atoms,
$R_7$ represents

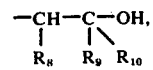

$R_8$ and $R_{10}$ represent hydrogen or methyl,
$R_9$ represents methyl, ethyl, phenyl, hydroxymethyl, $C_1$–$C_4$-alkoxymethyl, benzyloxymethyl, $C_1$–$C_4$-alkylcarbonyloxymethyl or $C_2$–$C_4$-alkenylcarbonyloxymethyl, the radical $OR_7$ is in the o- or p-position relative to the azo bridge, and
$m$ represents a number from 0 to 2,
are suitable for dyeing and printing natural and synthetic fibre materials containing amide groups.

11 Claims, No Drawings

BENZENESULPHONYLBENZENESULPHONAMIDEAZOPHENYL-OR-NAPHTHYL-AZOLHYDROXYLOWERALKOXYPHENYL DYESTUFFS

The subject of the present invention are new, valuable disazo dyestuffs which in the form of the free acid correspond to the general formula

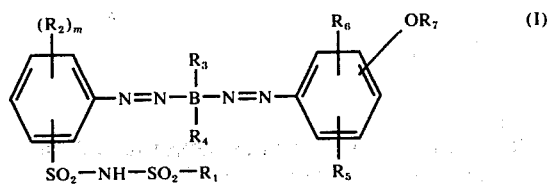

and their preparation and use for dyeing synthetic fibre materials, especially those consisting of polyamides.

In the general formula (I), $R_1$ represents an aromatic, aliphatic or dialkylamino radical, $R_2$ represents chlorine, bromine, an alkoxy group or an alkyl group, $R_3$ and $R_4$ represent hydrogen, chlorine, bromine, an alkoxy group or an alkyl group, $R_5$ and $R_6$ represent hydrogen, an alkyl group with 1–4 C atoms or an alkoxy group with 1–4 C atoms, $R_7$ represents

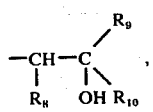

$R_8$ and $R_{10}$ represent hydrogen or methyl, $R_9$ represents methyl, ethyl, phenyl, hydroxymethyl, $C_1$–$C_4$-alkoxymethyl, benzyloxymethyl, $C_1$–$C_4$-alkylcarbonyloxymethyl or $C_2$–$C_4$-alkenylcarbonyloxymethyl, B represents a 1,4-phenylene, 1,4-naphthylene or 5,6,7,8-tetrahydro-1,4-naphthylene radical and $m$ represents a number from 0 to 2.

Examples of suitable radicals B are radicals of the formulae

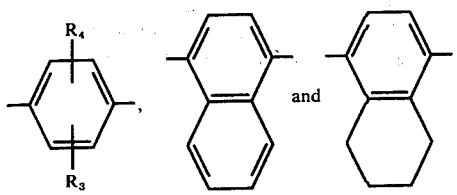

wherein $R_3$ and $R_4$ have the abovementioned meaning.

Preferred alkyl groups are those with 1–4 C atoms. The alkyl and alkoxy groups can be substituted further, for example by halogen, nitrile, hydroxyl or optionally substituted phenyl. Examples of suitable alkyl groups are —$CH_3$, —$C_2H_5$, —$C_3H_7$, —$C_4H_9$, —$C_2H_4CN$, —$CH_2$—$C_6H_5$ and $CF_3$.

Preferred alkoxy groups are those with 1–4 C atoms. Examples of suitable alkoxy groups are —$OCH_3$, —$OC_2H_5$, —$OC_3H_7$, —$OC_4H_9$, —$OCH_2CH_2OH$ and —$OCH_2C_6H_5$.

Examples of suitable aromatic radicals $R_1$ are optionally substituted phenyl radicals; examples of suitable aliphatic radicals are $C_1$–$C_4$-alkyl radicals; the dialkylamino groups in particular contain $C_1$–$C_4$-alkyl groups. Preferably, $R_1$ represents phenyl optionally substituted by $C_1$–$C_4$-alkyl, $C_1$–$C_4$-alkoxy, halogen, nitrile or nitro, or represents $C_1$–$C_4$-alkyl, but in particular phenyl and methylphenyl.

The disulphimide group of the formula (I) is in the ortho-, meta- or para-position relative to the azo bridge and the radical $OR_7$ is in the ortho- or para-position relative to the azo bridge.

Preferred dyestuffs are those of the formula

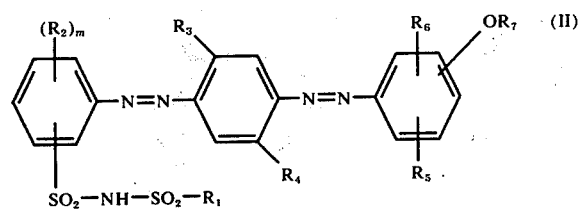

wherein $R_1$, $R_2$, $R_3$, $R_4$, $R_5$, $R_6$, $R_7$ and $m$ have the above-mentioned meaning, as well as those of the formula

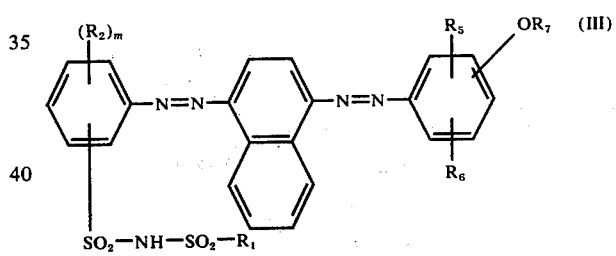

wherein $R_1$, $R_2$, $R_5$, $R_6$, $R_7$ and $m$ have the abovementioned meaning.

Further preferred dyestuffs are those of the formula

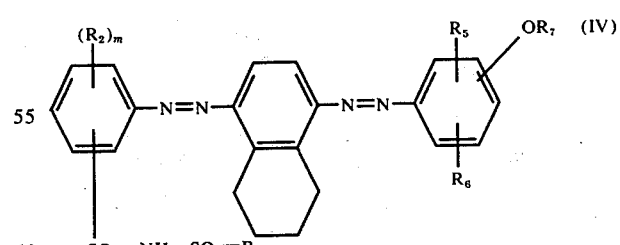

wherein $R_1$, $R_2$, $R_5$, $R_6$, $R_7$ and $m$ have the abovementioned meaning.

Particularly valuable dyestuffs are those of the formula

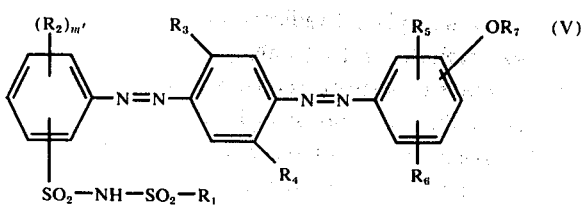

wherein
$R_1$, $R_2$, $R_3$, $R_4$, $R_5$, $R_6$ and $R_7$ have the abovementioned meaning and
$m'$ represents 0 or 1,
especially those of the formula

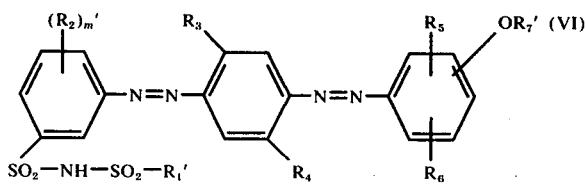

wherein
$R_2$, $R_3$, $R_4$, $R_5$ and $R_6$ have the abovementioned meaning and
$R_1'$ represents an optionally substituted phenyl radical,
$R_7'$ represents 2-hydroxypropyl or 2-hydroxybutyl and $m'$ represents 0 or 1.

Further particularly valuable dyestuffs are those of the formula

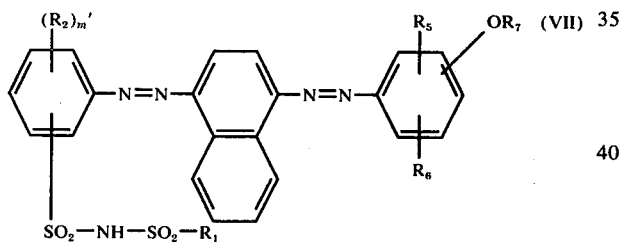

wherein
$R_1$, $R_2$, $R_5$, $R_6$ and $R_7$ have the abovementioned meaning and
$m'$ represents 0 or 1,
especially those of the formula

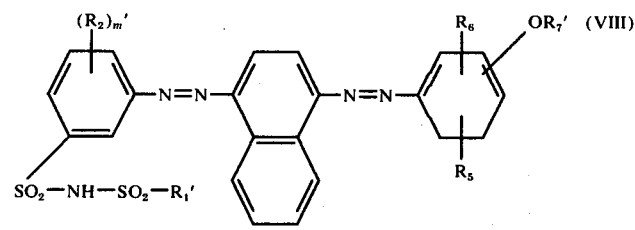

wherein
$R_2$, $R_5$ and $R_6$ have the abovementioned meaning and
$R_1'$ represents an optionally substituted phenyl radical,
$R_7'$ represents 2-hydroxypropyl or 2-hydroxybutyl and
$m'$ represents 0 or 1.

Further preferred dyestuffs correspond in the free acid form to the formula

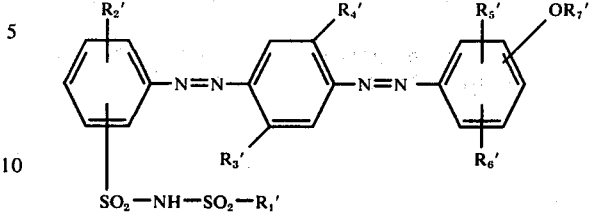

wherein
$R_1'$ represents an aromatic radical or an aliphatic radical with 1–4 carbon atoms,
$R_2'$ represents hydrogen, chlorine, bromine, a methoxy or ethoxy group, a methyl or ethyl group or a trifluoromethyl group,
$R_3'$ represents hydrogen, chlorine, a methyl or methoxy group or an ethyl or ethoxy group,
$R_4'$ represents hydrogen, a methyl or methoxy group or an ethyl or ethoxy group,
$R_5'$ and $R_6'$ independently of one another represent hydrogen, an alkyl group with 1–4 C atoms or an alkoxy group with 1–4 C atoms, and
$R_7'$ represents 2-hydroxypropyl or 2-hydroxybutyl.
and the formula

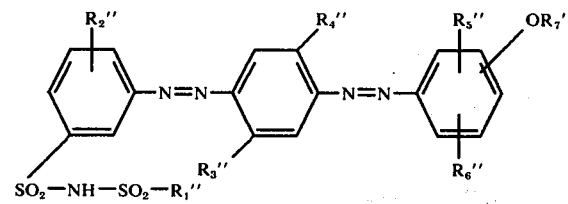

wherein
$R_1''$ represents an optionally substituted phenyl radical,
$R_2''$ represents hydrogen, chlorine, bromine, a methoxy or ethoxy group, a methyl or ethyl group or a trifluoromethyl group,
$R_3''$ represents hydrogen, chlorine, a methyl or methoxy group or an ethyl or ethoxy group,
$R_4''$ represents hydrogen, a methyl or methoxy group or an ethyl or ethoxy group,
$R_5''$ and $R_6''$ independently of one another represent hydrogen, an alkyl group with 1–4 C atoms or an alkoxy group with 1–4 C atoms, and
$R_7'$ represents 2-hydroxypropyl or 2-hydroxybutyl.

Other valuable dyestuffs are in the free acid form of the formula

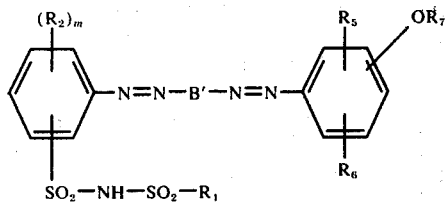

wherein
- B' represents a 1,4-naphthylene radical or a 5,6,7,8-tetrahydro-1,4-naphthylene radical,
- $R_1$ represents an aromatic radical or an aliphatic radical with 1–4 C atoms,
- $R_2$ represents chlorine, bromine, an alkoxy group or an alkyl group,
- $R_5$ and $R_6$ independently of one another represent hydrogen, an alkyl group with 1–4 C atoms or an alkoxy group with 1–4 C atoms,
- $R_7$ represents

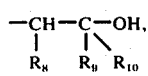

$R_8$ and $R_{10}$ represent hydrogen or methyl,
$R_9$ represents methyl, ethyl, phenyl, hydroxymethyl, $C_1$–$C_4$-alkoxymethyl, benzyloxymethyl, $C_1$–$C_4$-alkylcarbonyloxymethyl or $C_2$–$C_4$-alkenylcarboxyloxymethyl, and
$m$ represents a number from 0 to 2;
of the formula

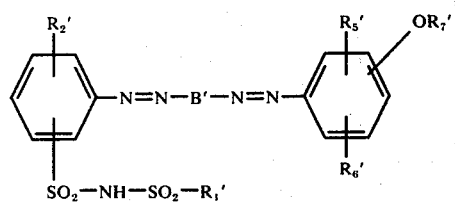

wherein
- B' represents a 1,4-naphthylene radical or a 5,6,7,8-tetrahydro-1,4-naphthylene radical,
- $R_1'$ represents an aromatic radical or an aliphatic radical with 1–4 C atoms,
- $R_2'$ represents hydrogen, chlorine, bromine, a methoxy or ethoxy group, a methyl or ethyl group or a trifluoromethyl group,
- $R_5'$ and $R_6'$ independently of one another represent hydrogen, an alkyl group with 1–4 C atoms or an alkoxy group with 1–4 C atoms, and
- $R_7'$ represents 2-hydroxypropyl or 2-hydroxybutyl.

and of the formula

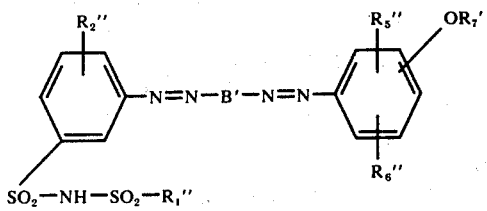

wherein

B' represents a 1,4-naphthylene radical of a 5,6,7,8-tetrahydro-1,4-naphthylene radical,
$R_1''$ represents an optionally substituted phenyl radical,
$R_2''$ represents hydrogen, chlorine, bromine, a methoxy or ethoxy group, a methyl or ethyl group or a trifluoromethyl group,
$R_5''$ and $R_6''$ independently of one another represent hydrogen, an alkyl group with 1–4 C atoms or an alkoxy group with 1–4 C atoms, and
$R_7'$ represents 2-hydroxypropyl or 2-hydroxybutyl.

The dyestuffs of the formula (I) are prepared in a known manner by diazotising amines of the formula

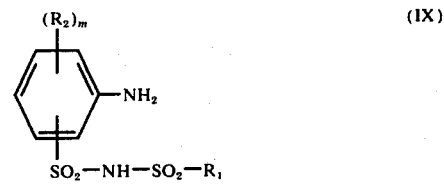

wherein
$R_1$, $R_2$ and $m$ have the abovementioned meaning and reacting the products with amines of the formula

wherein
$R_3$, $R_4$ and B have the abovementioned meaning and
Z represents H, —$SO_3H$ or —$CH_2SO_3H$
to give monoazo dyestuffs of the formula

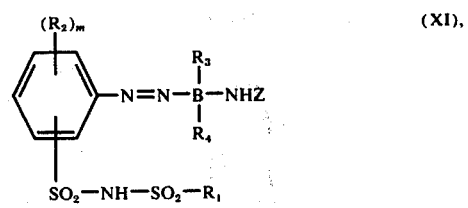

diazotising the monoazo dyestuffs thus obtained, if necessary after splitting off the group Z by alkaline or acid saponification, coupling the product with phenols which couple in the ortho- or para-position to the OH group, of the formula

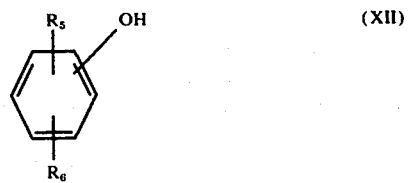

wherein
$R_5$ and $R_6$ have the abovementioned meaning, and then alkylating the disazo dyestuffs of the formula

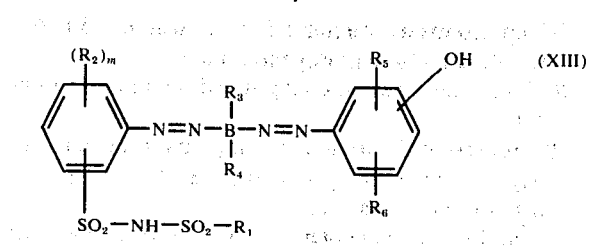

with appropriate alkylene oxides of the formula

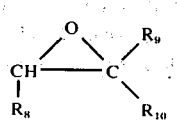

Suitable disulphimides of the formula (IX) are for example: (3-amino-benzenesulphonyl)-benzenesulphonamide, (3-amino-4-chloro-benzenesulphonyl)-benzenesulphonamide, (3-amino-benzenesulphonyl)-methanesulphonamide, (3-amino-benzenesulphonyl)-propanesulphonamide, (3-amino-benzenesulphonyl)-butanesulphonamide, (3-amino-benzenesulphonyl)-p-toluenesulphonamide, (3-amino-benzenesulphonyl)-o-toluenesulphonamide, (3-amino-4-chloro-benzenesulphonyl)-p-toluenesulphonamide, (3-amino-4-chloro-benzenesulphonyl)-methanesulphonamide, (3-amino-4-chloro-benzenesulphonyl)-butanesulphonamide, (3-amino-4-chloro-benzenesulphonyl)-o-toluenesulphonamide, (3-amino-6-methyl-benzenesulphonyl)-benzenesulphonamide, (3-amino-6-methyl-benzenesulphonyl)-butanesulphonamide, (3-amino-6-methyl-benzenesulphonyl)-methanesulphonamide, (3-amino-6-methyl-benzenesulphonyl)-p-toluenesulphonamide, (3-amino-6-methyl-benzenesulphonyl)-o-toluenesulphonamide, (3-amino-4-methyl-benzenesulphonyl)-benzenesulphonamide, (3-amino-4-methyl-benzenesulphonyl)-p-toluenesulphonamide, (3-amino-4-methyl-benzenesulphonyl)-o-toluenesulphonamide, (3-amino-4-methyl-benzenesulphonyl)-methanesulphonamide, (3-amino-4-methoxy-benzenesulphonyl)-benzenesulphonamide, (3-amino-4-methoxy-benzenesulphonyl)-p-toluenesulphonamide, (3-amino-4-methoxy-benzenesulphonyl)-methanesulphonamide, (3-amino-4-methoxy-benzenesulphonyl)-butanesulphonamide, (3-amino-6-methoxy-benzenesulphonyl)-benzenesulphonamide, (3-amino-6-methoxy-benzenesulphonyl)-p-toluenesulphonamide, (3-amino-6-methoxy-benzenesulphonyl)-methanesulphonamide, (3-amino-6-methoxy-benzenesulphonyl)-butanesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2-amino-benzenesulphonyl)-methanesulphonamide, (2-amino-benzenesulphonyl)-butanesulphonamide, (3-amino-6-ethyl-benzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromo-benzenesulphonyl)-benzenesulphonamide, (3-amino-4-bromo-benzenesulphonyl)-p-toluenesulphonamide, (3-amino-4-bromo-benzenesulphonyl)-o-toluenesulphonamide, (3-amino-4-bromo-benzenesulphonyl)-methanesulphonamide, (3-amino-4-bromo-benzenesulphonyl)-butanesulphonamide, (2-amino-3-chloro-4-methyl-benzenesulphonyl)-benzenesulphonamide, (2-amino-3-chloro-4-methoxy-benzenesulphonyl)-benzenesulphonamide, (3-amino-4-chloro-5-methyl-benzenesulphonyl)-benzenesulphonamide, (3-amino-5-chloro-6-methyl-benzenesulphonyl)-benzenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-methyl-benzenesulphonyl)-methanesulphonamide, (4-amino-5-methyl-benzenesulphonyl)-benzenesulphonamide, (3-amino-4-trifluoromethyl-benzenesulphonyl)-benzenesulphonamide, (4-amino-3-trifluoromethyl-benzenesulphonyl)-methanesulphonamide, (3-amino-benzenesulphonyl)-dimethylsulphamic acid amide and (3-amino-benzenesulphonyl)-dibutylsulphamic acid amide.

Examples of suitable middle components of the formula (X) are: aniline, 2-aminotoluene, 3-aminotoluene, 2-amino-ethylbenzene, 3-amino-ethylbenzene, 3-chloroaniline, 3-bromo-aniline, 2-aminoanisole, 3-aminoanisole, 2-amino-ethoxybenzene, 3-amino-ethoxybenzene, 1-amino-2,3-dimethylbenzene, 1-amino-2,5-dimethylbenzene, 1-amino-3,5-dimethylbenzene, 3-amino-4-methoxy-toluene, 2-amino-4-methoxy-toluene, 2-amino-1,4-dimethoxy-benzene, 2-amino-4-ethoxy-toluene, 2-amino-1,4-diethoxy-benzene, α-naphthylamine, 5,6,7,8-tetrahydro-1-naphthylamine and their N-sulphonic acids or their N-ω-methanesulphonic acids.

The following may be mentioned as examples of suitable end components of the formula (XII): phenol, o-cresol, m-cresol, p-cresol, 1-hydroxy-4-ethyl-benzene, 1-hydroxy-4-tertiary butyl-benzene, 1-hydroxy-2-ethyl-benzene, 1-hydroxy-2-isopropyl-benzene, 1-hydroxy-2-secondary butyl-benzene, 3-hydroxy-1,2-dimethyl-benzene, 2-hydroxy-1,4-dimethyl-benzene, ,4-hydroxy-1,2-dimethyl-benzene, 2-hydroxy-1,3-diethyl-benzene, 1-hydroxy-2-methoxy-benzene, 1-hydroxy-3-methoxy-benzene, 1-hydroxy-3-ethoxy-benzene, 1-hydroxy-4-butoxy-benzene and 1-hydroxy-3-butoxy-benzene.

Examples of suitable alkylene oxides are propylene oxide, 1,2- and 2,3-butylene oxide, styrene oxide, glycidol, glycidyl methyl ether, glycidyl acetate, glycidyl propionate, glycidyl methacrylate, glycidyl benzyl ether and isobutylene oxide.

The diazotisation of the amines of the formula (IX) is carried out according to methods which are in themselves known, preferably with sodium nitrite in aqueous solution containing mineral acid. The coupling of the diazonium compounds of the amines of the formula (IX) with the coupling components of the formula (X) can be carried out in accordance with processes which are in themselves known, for example in a neutral to strongly acid, but preferably in a weakly acid, pH range, in an aqueous or aqueous-organic medium.

The monoazo dyestuffs of the formula (XI) are isolated in accordance with known methods, for example by filtration or by salting out with a salt soluble in aqueous solution, for example with NaCl or KCl, followed by filtration. If coupling components of the formula (X) with Z = SO₃H or —CH₂—SO₃H are employed, isolation of the monoazo dyestuffs is frequently only necessary after the amino group of the coupling component has been liberated by alkaline or acid saponification. However, an intermediate isolation of the monoazo dyestuffs is not always necessary - they can also be diazotised further without being isolated.

The further diazotisation of the aminoazo dyestuffs (XI) with Z = H can be carried out, for example, in an acid, aqueous dispersion by means of sodium nitrite solution; for this purpose, the diazotisation temperatures can be between 0° and 30° C. Aminoazo dyestuffs of the formula (XI) with Z = H can furthermore also be diazotised indirectly by dissolving them in alkaline solutions, adding sodium nitrite solution and pouring the mixture into aqueous hydrochloric acid, or adding hydrochloric acid to the mixture.

The coupling of the diazotised aminoazo dyestuffs (XI) with the end components (XII) to give the disazo dyestuffs (XIII) is also carried out in the usual manner, preferably in an aqueous alkaline medium. The disazo dyestuffs of the formula (XIII) can be isolated by simply filtering them off, if necessary after addition of sodium chloride. If the dyestuffs are obtained in an impure form, they can be recrystallised in a known manner from hot water, if necessary with addition of alkali.

The reaction of the disazo dyestuffs (XIII) with the alkylene oxides to give the dyestuffs (I) is carried out in the usual manner, for example in an aqueous alkaline medium.

The reaction is most advantageously carried out at temperatures of 70°–90° C, if appropriate in an autoclave in the case of low-boiling alkylene oxides (for example propylene oxide). The most advantageous yields of alkylated product are obtained by introducing 2 to 4 mols of alkylene oxide into the reaction mixture per mol of phenolic dyestuff.

The more sparingly soluble dyestuffs (I) can be rendered readily water-soluble by mixing them with salts of strong bases and weak acids, for example trisodium phosphate, disodium hydrogen phosphate, sodium tetraborate, sodium metaphosphate, sodium metasilicate or sodium carbonate.

The new dyestuffs of the formula (I) can be isolated in the form of the free acid or as alkali metal salts or ammonium salts, or can be in this form, or can be employed in this form for their further use. Suitable alkali metal salts, in which the hydrogen atom of the —NH— group is thus replaced by an alkali metal cation, are, for example, the sodium, potassium or lithium salts.

The new dyestuffs are particularly suitable for dyeing and printing natural and synthetic fibre materials containing amide groups, for example fibre materials of wool, silk and polyamide, such as poly-ε-caprolactam or the reaction product of hexamethylenediamine with adipic acid. The dyeings obtained, especially those on polyamide materials, are distinguished by good fastness properties, especially by good wet fastness properties and good light fastness properties. The neutral affinity, and the behaviour when combined with other suitable dyestuffs for such material, are also good. The dyestuffs of the formula (I) are employed for dyeing either in the form of the free acid (> NH) or as an alkali metal salt or as the ammonium salt. Because of their excellent solubility the dyestuffs are particularly suitable for the preparation of concentrated aqueous solutions.

In the examples which follow, parts denote parts by weight and percentages denote percentages by weight.

EXAMPLE 1

31.2 parts of (3-amino-benzenesulphonyl)-benzenesulphonamide are dissolved in 200 parts of water by addition of 10% strength sodium hydroxide solution, and 7.0 parts of sodium nitrite are added. The solution thus obtained is allowed to run into 200 parts of ice/H₂O and 35 parts of concentrated hydrochloric acid and the diazotisation is carried out in 0.5 hour at 0°–5° C; the excess nitrous acid is then removed with amidosulphonic acid, the diazonium salt suspension is allowed to run into a solution of 20.5 parts of anilino-methanesulphonic acid and 9 parts of sodium bicarbonate in 100 parts of water at 0°–5° C and the pH is kept at between 5 and 7 by further addition of sodium bicarbonate. After completion of coupling, the product is salted out with sodium chloride, filtered off and washed with saturated sodium chloride solution. The moist dyestuff paste is stirred in 200 parts of 7% strength sodium hydroxide solution for 1 hour at 80°–90° C. After completion of the splitting off of the sulphomethyl group, the dyestuff is precipitated by adding sodium chloride, filtered off and washed with saturated sodium chloride solution.

The aminoazo dyestuff thus obtained is dissolved in 500 parts of water, 7.0 parts of sodium nitrite are added, the dyestuff is diazotised in 30 minutes at 10°–20° C by pouring the mixture into 1,000 parts of water and 30 parts of concentrated hydrochloric acid, and the excess nitrous acid is then destroyed with amidosulphonic acid. The diazonium salt suspension thus obtained is stirred into a solution of 9.5 parts of phenol and 4 parts of sodium hydroxide in 200 parts of water at 10°–20° C and the pH is kept at between 8 and 9 by adding 10% strength sodium hydroxide solution. After completion of coupling, the disazo dyestuff is filtered off and dissolved in 500 ml of water and 200 ml isopropanol and the pH is adjusted to 7.5–8.0, and 18 g of 1,2-butylene oxide are added dropwise at 70° C. The mixture is stirred for 10 hours at 70° C and allowed to cool, and the dyestuff which has precipitated is filtered off, washed with sodium chloride solution and dried in vacuo at 50° C. In the form of the free acid, the dyestuff corresponds to the formula

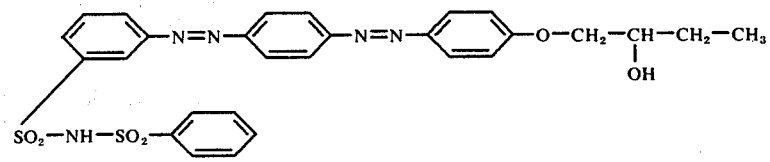

It dyes polyamide, from a weakly acid or neutral bath, in yellow shades of good fastness properties.

If the procedure indicated in the preceding example is followed and the starting components, middle components, end components and alkylene oxides indicated in the table which follows are used, further disazo dyestuffs of the general formula (I) are obtained, which dye polyamide in yellow to bluish red shades.

Table

| Example | Starting component | Middle component | End component | Alkylene oxide |
| --- | --- | --- | --- | --- |
| 2 | (3-Amino-benzenesulphonyl)-benzenesulphonamide | Aniline | o-Cresol | Propylene oxide |
| 3 | " | " | m-Cresol | " |
| 4 | " | " | p-Cresol | " |
| 5 | " | " | 3-Methoxyphenol | " |
| 6 | " | " | 1-Hydroxy-2-ethyl-benzene | " |
| 7 | " | " | 2-Hydroxy-1,3-dimethyl-benzene | 1,2-Butylene oxide |
| 8 | " | " | 2-Hydroxy-1,4-dimethyl-benzene | " |
| 9 | " | 3-Amino-toluene | Phenol | " |
| 10 | " | " | o-Cresol | " |
| 11 | " | " | p-Cresol | " |
| 12 | " | " | 1-Hydroxy-4-ethyl-benzene | " |
| 13 | " | " | 1-Hydroxy-3-ethoxy-benzene | " |
| 14 | " | " | 4-Hydroxy-1,2-dimethyl-benzene | " |
| 15 | " | 3-Amino-4-methoxy-toluene | Phenol | Propylene oxide |
| 16 | " | " | o-Cresol | 2,3-Butylene oxide |
| 17 | " | " | 4-tert.-Butylphenol | 1,2-Butylene oxide |
| 18 | " | " | m-Cresol | " |
| 19 | " | " | 3-Methoxyphenol | " |
| 20 | " | " | 3-Ethoxyphenol | " |
| 21 | " | " | 2-Hydroxy-1,4-dimethylbenzene | " |
| 22 | " | " | 3-Hydroxy-1,2-dimethylbenzene | " |
| 23 | " | " | p-Cresol | " |
| 24 | " | 3-Amino-anisole | Phenol | " |
| 25 | " | " | o-Cresol | " |
| 26 | " | " | p-Cresol | " |
| 27 | " | " | m-Cresol | " |
| 28 | " | " | 4-tert.-Butylphenol | " |
| 29 | " | " | 3-Methoxyphenol | " |
| 30 | " | " | 2-Methoxyphenol | " |
| 31 | " | " | 2-Hydroxy-1,4-dimethylbenzene | Propylene oxide |
| 32 | " | 2-Aminotoluene | Phenol | 1,2-Butylene oxide |
| 33 | " | " | o-Cresol | " |
| 34 | " | " | p-Cresol | " |
| 35 | " | " | 4-Ethylphenol | " |
| 36 | " | " | 4-Hydroxy-1,2-dimethylbenzene | " |
| 37 | " | " | 3-Methoxyphenol | " |
| 38 | " | " | 3-Ethoxyphenol | 2,3-Butylene oxide |
| 39 | " | " | 2-Isopropylphenol | " |
| 40 | " | " | 2-Hydroxy-1,3-diethylbenzene | " |
| 41 | " | 3-Amino-ethyl-benzene | Phenol | " |
| 42 | " | " | o-Cresol | Propylene oxide |
| 43 | " | " | p-Cresol | " |
| 44 | " | " | 4-Hydroxy-1,2-dimethylbenzene | 1,2-Butylene oxide |
| 45 | " | " | 3-Methoxyphenol | " |
| 46 | " | " | 4-tert.-Butylphenol | " |
| 47 | " | 2-Amino-ethyl-benzene | Phenol | " |
| 48 | " | " | p-Cresol | " |
| 49 | " | " | o-Cresol | " |
| 50 | " | " | 4-Ethylphenol | " |
| 51 | " | "2-Methoxyphenol | " | " |
| 52 | " | 2-Amino-anisole | Phenol | " |
| 53 | " | " | o-Cresol | " |
| 54 | " | " | p-Cresol | " |
| 55 | " | " | 3-Methoxyphenol | " |
| 56 | " | " | 4-Butoxyphenol | " |
| 57 | " | " | 2-Isopropylphenol | " |
| 58 | " | 3-Bromo-aniline | Phenol | " |
| 59 | " | " | m-Cresol | " |
| 60 | " | " | 4-Ethylphenol | " |
| 61 | " | " | 2-Hydroxy-1,4-dimethylbenzene | " |
| 62 | " | 3-Amino-ethoxy-benzene | Phenol | Propylene oxide |
| 63 | " | " | o-Cresol | Styrene oxide |
| 64 | " | " | 4-tert.-Butylphenol | Propylene oxide |
| 65 | " | " | 3-Methoxyphenol | " |
| 66 | " | " | 2-Methoxyphenol | " |
| 67 | " | 3-Chloro-aniline | Phenol | " |
| 68 | " | " | p-Cresol | " |
| 69 | " | " | 2-secondary Butyl-phenyl | Glycidol |
| 70 | " | " | 4-Ethylphenol | 1,2-Butylene oxide |
| 71 | " | 1-Amino-2,3-dimethyl- | Phenol | " |

Table-continued

| Example | Starting component | Middle component | End component | Alkylene oxide |
|---|---|---|---|---|
| | | benzene | | |
| 72 | " | " | m-Cresol | " |
| 73 | " | " | p-Cresol | " |
| 74 | " | " | 4-Ethylphenol | " |
| 75 | " | " | 3-Hydroxy-1,2-dimethylbenzene | " |
| 76 | " | 2-Amino-4-methoxytoluene | Phenol | " |
| 77 | " | " | o-Cresol | Glycidyl methyl ether |
| 78 | " | " | 4-tert.-Butylphenol | 1,2-Butylene oxide |
| 79 | " | " | 3-Methoxyphenol | " |
| 80 | " | 2-Amino-1,4-methoxybenzene | Phenol | " |
| 81 | " | 2-Amino-1,4-dimethoxybenzene | o-Cresol | " |
| 82 | " | " | p-Cresol | " |
| 83 | " | " | 4-Ethylphenol | " |
| 84 | " | " | 4-Hydroxy-1,2-dimethylbenzene | " |
| 85 | " | 1-Amino-2,5-dimethylbenzene | Phenol | " |
| 86 | " | " | m-Cresol | Propylene oxide |
| 87 | " | " | 4-Ethylphenol | " |
| 88 | " | " | 3-Methoxyphenol | " |
| 89 | " | " | 2-Hydroxy-1,4-dimethylphenol | " |
| 90 | " | 2-Amino-4-ethoxytoluene | Phenol | " |
| 91 | " | " | m-Cresol | 2,3-Butylene oxide |
| 92 | " | " | p-Cresol | Glycidol |
| 93 | " | " | 3-Ethoxyphenol | " |
| 94 | " | " | 2-Ethylphenol | " |
| 95 | " | 2-Amino-1,4-diethoxybenzene | Phenol | Styrene oxide |
| 96 | " | " | 4-Ethylphenol | 1,2-Butylene oxide |
| 97 | " | " | 4-tert.-Butylphenol | " |
| 98 | " | α-Naphthylamine | p-Cresol | " |
| 99 | " | " | o-Cresol | " |
| 100 | " | " | Phenol | " |
| 101 | " | " | 3-Methoxyphenol | " |
| 102 | " | " | 4-Ethylphenol | " |
| 103 | " | " | 4-tert.-Butylphenol | " |
| 104 | " | " | 2-Hydroxy-1,4-dimethylbenzene | " |
| 105 | " | " | 2-Hydroxy-1,3-diethylbenzene | " |
| 106 | " | 5,6,7,8-Tetrahydro-1-naphthylamine | Phenol | " |
| 107 | " | " | o-Cresol | " |
| 108 | " | " | p-Cresol | " |
| 109 | " | " | 4-Ethylphenol | " |
| 110 | " | " | 3-Methoxyphenol | Propylene oxide |
| 111 | " | 2-Methoxyaniline | m-Cresol | 1,2-Butylene oxide |
| 112 | " | 2,5-Dimethoxyaniline | Phenol | Styrene oxide |
| 113 | " | Aniline | m-Cresol | Propylene oxide |
| 114 | " | " | o-Cresol | " |
| 115 | (3-Amino-benzenesulphonyl)-p-toluenesulphonamide | 3-Methylaniline | Phenol | |
| 116 | " | " | m-Cresol | Glycidol |
| 117 | (3-Amino-benzenesulphonyl)-o-toluenesulphonamide | Aniline | o-Cresol | Glycidyl butyl ether |
| 118 | " | 3-Methylaniline | o-Cresol | Glycidyl benzyl ether |
| 119 | (3-Amino-benzenesulphonyl)-butanesulphonamide | 2,5-Dimethoxyaniline | o-Cresol | Propylene oxide |
| 120 | (3-Amino-6-methyl-benzenesulphonyl)-benzenesulphonamide | 2,5-Dimethoxyaniline | Phenol | Propylene oxide |
| 121 | (3-Amino-4-methyl-benzenesulphonyl)-p-toluenesulphonamide | Aniline | Phenol | Glycidyl acetate |
| 122 | " | 2,5-Dimethoxyaniline | m-Cresol | Propylene oxide |
| 123 | (3-Amino-4-methoxy-benzenesulphonyl)-p-toluenesulphonamide | " | Phenol | " |
| 124 | (2-Aminobenzenesulphonyl)-o-toluenesulphonamide | " | o-Cresol | " |
| 125 | (3-Amino-6-ethyl-benzenesulphonyl)-methanesulphonamide | 2-Methoxyaniline | o-Cresol | " |
| 126 | " | 3-Methylaniline | o-Cresol | 1,2-Butylene oxide |
| 127 | (4-Amino-benzenesulphonyl)-p-toluenesulphonamide | " | m-Cresol | " |
| 128 | (4-Amino-benzenesulphonyl)-butanesulphonamide | Aniline | m-Cresol | Propylene oxide |
| 129 | (3-Amino-4-chloro-5-methyl-benzenesulphonyl)-benzenesulphonamide | " | Phenol | " |
| 130 | (4-Amino-5-methyl-benzenesulphonyl)-methanesulphonamide | " | Phenol | " |
| 131 | (3-Amino-benzenesulphonyl)- | " | m-Cresol | Isobutylene oxide |

Table-continued

| Example | Starting component | Middle component | End component | Alkylene oxide |
|---|---|---|---|---|
| 132 | benzenesulphonamide " | 2-Amino-anisole | Phenol | " |

DYEING EXAMPLE 0.1 g of the dyestuff of example 1 dissolved in 100 ml of hot water, 5 ml of 10% strength ammonium acetate solution are added and the mixture is diluted to a volume of 500 ml with water. 10 g of polyamide fibre are introduced into the dyebath, which is brought to the boil over the course of 20 minutes, 4 ml of 10% strength acetic acid are added and the mixture is kept at the boil for 1 hour. The material is then rinsed and dried at 70°–80° C.

We claim:
1. Disazo dyestuff which in the form of the free acid corresponds to the formula

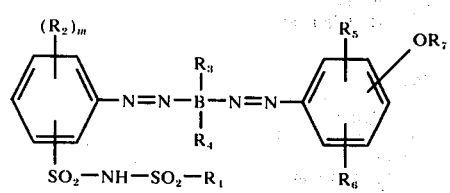

wherein
B is 5,6,7,8-tetrahydro-1,4-naphthylene, 1,4-naphthylene, or 1–4 phenylene;
$R_1$ is phenyl; phenyl substituted by $C_1$–$C_4$-alkyl, $C_1$–$C_4$-alkoxy, halogen, nitrile, or nitro; $C_1$–$C_4$-alkyl;
$R_2$ is chlorine, bromine, or alkyl or alkoxy having 1–4 carbon atoms;
$R_3$ and $R_4$ independently of one another are hydrogen, chlorine, bromine, or alkoxy or alkyl having 1–4 carbon atoms;
$R_5$ and $R_6$ independently of one another are hydrogen, alkyl having 1–4 carbon atoms, or alkoxy having 1–4 carbon atoms;
$R_7$ represents

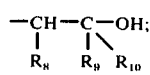

$R_8$ and $R_{10}$ independently of one another are hydrogen or methyl;
$R_9$ is methyl, ethyl, phenyl, hydroxymethyl, $C_1$–$C_4$-alkoxymethyl, benzyloxymethyl, $C_1$–$C_4$-alkyl-carbonyloxymethyl or $C_2$–$C_4$-alkenylcarbonyloxymethyl;
the radical $OR_7$ is in the o- or p- position relative to the azo bridge, and
$m$ is a number from 0 to 2.

2. Disazo dyestuff which in the form of the free acid corresponds to the formula

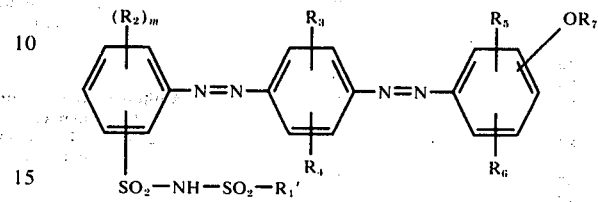

wherein
$R_1'$ is phenyl; phenyl substituted with $C_1$–$C_4$-alkyl, $C_1$–$C_4$-alkoxy, halogen, nitrile, or nitro; or $C_1$–$C_4$-alkyl;
$R_2$ is chlorine, bromine, or alkyl or alkoxy having 1–4 carbon atoms;
$R_3$ and $R_4$ independently of one another are hydrogen, chlorine, bromine, or alkoxy or alkyl having 1–4 carbon atoms;
$R_5$ and $R_6$ are hydrogen, alkyl with 1–4 carbon atoms, or alkoxy with 1–4 carbon atoms;
$R_7$ represents

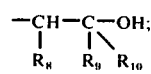

$R_8$ and $R_{10}$ independently of one another are hydrogen or methyl;
$R_9$ is methyl, ethyl, phenyl, hydroxymethyl, $C_1$–$C_4$-alkoxymethyl, benzyloxymethyl, $C_1$–$C_4$-alkyl-carbonyloxymethyl or $C_2$–$C_4$-alkenylcarbonyloxymethyl;
the radical $OR_7$ is in the o- or p-position relative to the azo group; and
$m$ is a number from 0 to 2.

3. Disazo dyestuff which in the form of the free acid corresponds to the formula

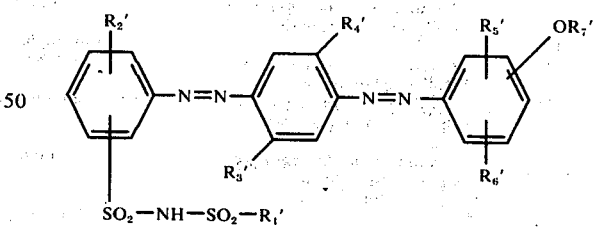

wherein
$R_1'$ is phenyl; phenyl substituted with $C_1$–$C_4$-alkyl, $C_1$–$C_4$-alkoxy, halogen, nitrile, or nitro; or $C_1$–$C_4$-alkyl;
$R_2'$ is hydrogen, chlorine, bromine, methoxy, ethoxy, methyl, ethyl or trifluoromethyl;
$R_3'$ is hydrogen, chlorine, methyl, methoxy, ethyl, or ethoxy;
$R_4'$ is hydrogen, methyl, methoxy, ethyl, or ethoxy;
$R_5'$ and $R_6'$ independently of one another are hydrogen, alkyl with 1–4 carbon atoms, or alkoxy with 1–4 carbon atoms;

$R_7'$ is 2-hydroxypropyl or 2-hydroxybutyl; and wherein the radical $OR_7'$ is in the o- or p-position relative to the azo group.

4. Disazo dyestuff which in the form of the free acid corresponds to the formula

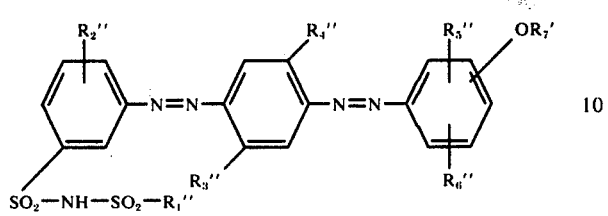

wherein
$R_1''$ is phenyl, or methylphenyl;
$R_2''$ is hydrogen, chlorine, bromine, methoxy, ethoxy, methyl, ethyl, or trifluoromethyl;
$R_3''$ is hydrogen, chlorine, methyl, methoxy, ethyl, or ethoxy;
$R_4''$ is hydrogen, methyl, methoxy, ethyl, or ethoxy;
$R_5''$ and $R_6''$ independently of one another are hydrogen, alkyl with 1–4 carbon atoms, or alkoxy with 1–4 carbon atoms;
$R_7'$ is 2-hydroxypropyl or 2-hydroxybutyl; and
the radical $OR_7'$ is in o- or p-position relative to the azo group.

5. Disazo dyestuff which in the form of the free acid corresponds to the formula

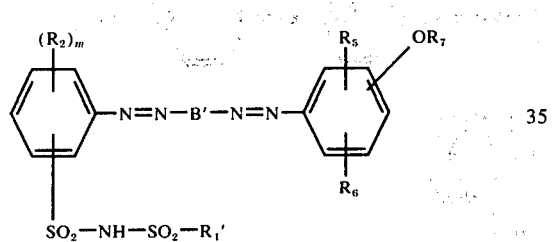

wherein
B' is 1,4-naphthylene or 5,6,7,8-tetrahydro-1,4-naphthylene;
$R_1'$ is phenyl; phenyl substituted with $C_1$–$C_4$-alkyl, $C_1$–$C_4$-alkoxy, halogen, nitrile, or nitro; or $C_1$–$C_4$-alkyl;
$R_2$ is chlorine, bromine, or alkoxy or alkyl having 1–4 carbon atoms;
$R_5$ and $R_6$ independently of one another represent hydrogen, alkyl with 1–4 carbon atoms, or alkoxy with 1–4 carbon atoms;
$R_7$ represents

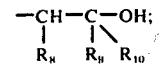

$R_8$ and $R_{10}$ independently of one another are hydrogen or methyl;
$R_9$ is methyl, ethyl, phenyl, hydroxymethyl, $C_1$–$C_4$-alkoxymethyl, benzyloxymethyl, $C_1$–$C_4$-alkyl-carbonyloxymethyl or $C_2$–$C_4$-alkenylcarbonyloxymethyl;
the radical $OR_7$ is in the o- or p-position relative to the azo group, and
m is a number from 0 to 2.

6. Disazo dyestuff which in the form of the free acid corresponds to the formula

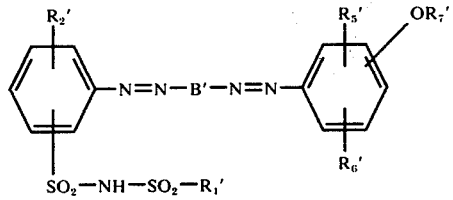

wherein
B' is 1,4-naphthylene radical or 5,6,7,8-tetrahydro-1,4-naphthylene;
$R_1'$ is phenyl; phenyl substituted with $C_1$–$C_4$-alkyl, $C_1$–$C_4$-alkoxy, halogen, nitrile, or nitro; or $C_1$–$C_4$-alkyl;
$R_2'$ is hydrogen, chlorine, bromine, methoxy, ethoxy, methyl, ethyl, or trifluoromethyl;
$R_5'$ and $R_6'$ independently of one another are hydrogen, alkyl with 1–4 carbon atoms, or alkoxy with 1–4 carbon atoms;
$R_7'$ is 2-hydroxypropyl or 2-hydroxybutyl; and
the radical $OR_7'$ is in o- or p-position relative to the azo group.

7. Dyestuff of claim 1 of the formula

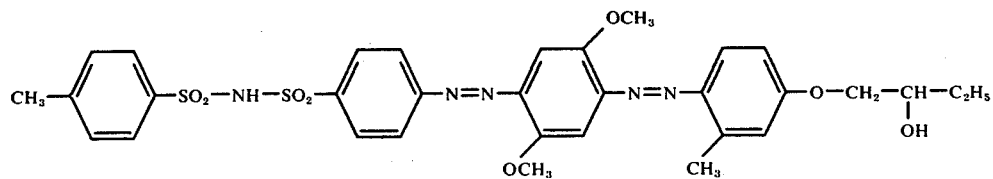

8. Dyestuff of claim 1 of the formula

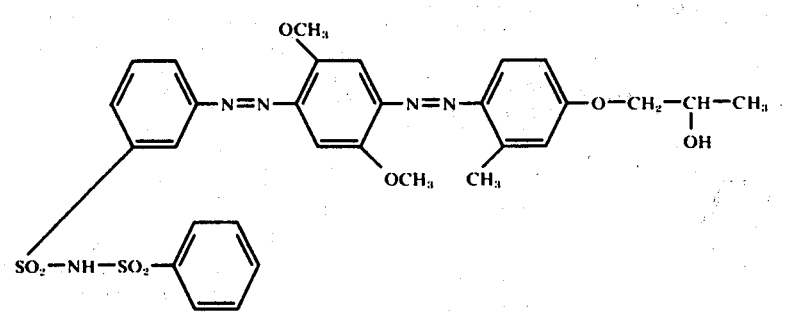
9. Dyestuff of claim 1 of the formula
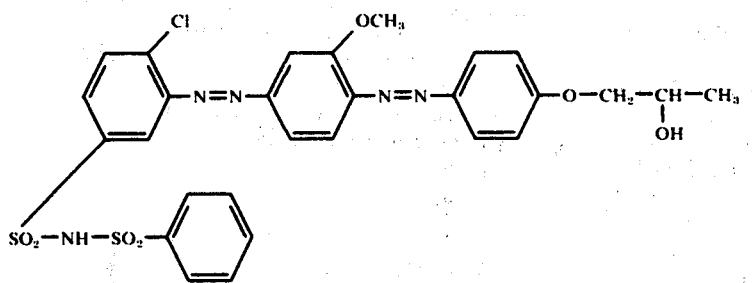
10. Dyestuff of claim 1 of the formula
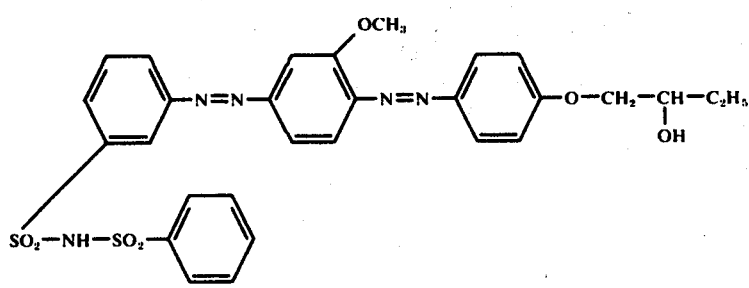
11. Dyestuff of claim 1 of the formula
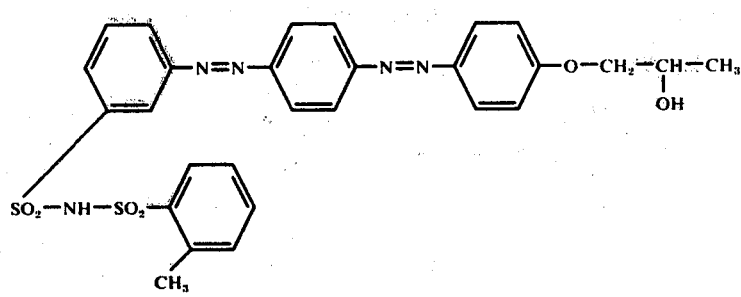
* * * * *